United States Patent
Shen et al.

(10) Patent No.: US 8,922,533 B2
(45) Date of Patent: Dec. 30, 2014

(54) MICRO-ELECTRO-MECHANICAL DISPLAY MODULE AND DISPLAY METHOD

(75) Inventors: Weng-Chang Shen, Taoyuan County (TW); Hsu-Hsiang Tseng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 213 days.

(21) Appl. No.: 13/535,373

(22) Filed: Jun. 28, 2012

(65) Prior Publication Data

US 2014/0002512 A1    Jan. 2, 2014

(51) Int. Cl.
  *G06F 3/038* (2013.01)
  *G09G 5/00* (2006.01)
(52) U.S. Cl.
  USPC .......................................... 345/204; 345/691
(58) Field of Classification Search
  CPC .................................................. G02B 26/0833
  USPC ....................................................... 345/204
  See application file for complete search history.

(56) References Cited

U.S. PATENT DOCUMENTS

| | | | |
|---|---|---|---|
| 2005/0073659 A1* | 4/2005 | Sannohe et al. | 353/56 |
| 2012/0287509 A1* | 11/2012 | Muneyoshi et al. | 359/601 |
| 2012/0300494 A1* | 11/2012 | Watabe et al. | 362/602 |
| 2012/0307192 A1* | 12/2012 | Andou et al. | 349/153 |

* cited by examiner

*Primary Examiner* — Viet Pham
(74) *Attorney, Agent, or Firm* — Jianq Chyun IP Office

(57) ABSTRACT

A micro-electro-mechanical (MEM) display module including a MEM display panel and a light-emitting apparatus is provided. The MEM display panel includes a plurality of first light-shielding units, a plurality of second light-shielding units, a light-shielding pattern layer and a reflective pattern layer. Each first light-shielding unit includes a first movable light-shielding device having at least one first opening. Each second light-shielding unit includes a second movable light-shielding device having at least one second opening. The light-shielding pattern layer has a plurality of third openings. In a display mode, the first opening of at least one first movable light-shielding device overlaps at least one third opening, and each second movable light-shielding device covers the reflective pattern layer. In a reflective mode, the light-shielding pattern layer covers the first opening of each first movable light-shielding device, and the second opening of each second movable light-shielding device exposes the reflective pattern layer.

19 Claims, 9 Drawing Sheets

MICRO-ELECTRO-MECHANICAL DISPLAY MODULE AND DISPLAY METHOD

BACKGROUND

1. Technical Field

The disclosure relates to a display module, and more particularly to a micro-electro-mechanical (MEM) display module.

2. Background

A micro-electro-mechanical system (MEMS) includes both electrical and mechanical components and has a size of a micrometer scale. To realize components of various small sizes, the MEMS components are usually manufactured with the integrated circuit (IC) manufacturing technology. The MEMS may be applied in multiple products, such as ink cartridges of inkjet printers, accelerometers for the inflation of vehicle air bags or other sensors. The MEMS is one of the most rapidly developing industrial fields currently. Annual sales of products related to the MEMS are estimated to reach tens of billions of dollars. In addition, optical devices using the MEMS, such as optical attenuators and switches, also play an important role in the fields of telecommunication and computer network. Furthermore, the MEMS is also applied in the display field. However, conventional micro-electro-mechanical (MEM) displays only have a single display function, and the added value thereof is not high.

SUMMARY

The disclosure provides a micro-electro-mechanical (MEM) display module that has both a display function and a mirror-like function, and the added value of the MEM display module is high.

The disclosure provides a MEM display module including a MEM display panel and a light-emitting apparatus disposed beside the MEM display panel. The MEM display panel includes a substrate, a plurality of first light-shielding units, a plurality of second light-shielding units, a light-shielding pattern layer, and a reflective pattern layer. Each of the first light-shielding units includes a first movable light-shielding device having at least one first opening. The first light-shielding units and the second light-shielding units are arranged in arrays on the substrate. Each of the second light-shielding units includes a second movable light-shielding device having at least one second opening. The light-shielding pattern layer is disposed on the substrate and has a plurality of third openings. The reflective pattern layer is disposed on the substrate. When the MEM display module is in a display mode, the first opening of at least one of the first movable light-shielding devices overlaps the third openings, and each of the second movable light-shielding devices covers the reflective pattern layer. When the MEM display module is in a reflective mode, the first opening of each of the first movable light-shielding devices is covered by the light-shielding pattern layer, and the second opening of each of the second movable light-shielding devices exposes the reflective pattern layer.

The disclosure provides a display method including the following steps. A light-emitting apparatus is provided to emit an illumination beam. A plurality of first light-shielding units are provided and disposed on a transmission path of the illumination beam. A time for which the first light-shielding units shield the illumination beam is controlled respectively to display an image frame. A reflective pattern layer is provided. A plurality of second light-shielding units are provided. A time for which the second light-shielding units expose the reflective pattern layer is controlled to determine an amount of an external beam reflected by the reflective pattern layer.

In an embodiment of the disclosure, when the MEM display module is in the display mode, the second opening of each of the second movable light-shielding devices is covered by the reflective pattern layer.

In an embodiment of the disclosure, the reflective pattern layer is filled into at least one of the third openings.

In an embodiment of the disclosure, each of the first light-shielding units further includes a first active device. The first active device makes the first movable light-shielding device move. Each of the second light-shielding units further includes a second active device. The second active device makes the second movable light-shielding device move.

In an embodiment of the disclosure, each of the first light-shielding units further includes a first actuator connected with the first movable light-shielding device. The first actuator is adapted for being attracted by a first drain of the first active device to lead the first movable light-shielding device to move relative to the light-shielding pattern layer. Each of the second light-shielding units further includes a second actuator connected with the second movable light-shielding device. The second actuator is adapted for being attracted by a second drain of the second active device to lead the second movable light-shielding device to move relative to the reflective pattern layer.

In an embodiment of the disclosure, the MEM display panel further includes a plurality of data lines and a plurality of scan lines interlaced with the data lines. A plurality of first sources of the first active devices and a plurality of second sources of the second active devices are electrically connected with the data lines. A plurality of first gates of the first active devices and a plurality of second gates of the second active devices are electrically connected with the scan lines.

In an embodiment of the disclosure, the light-emitting apparatus includes a first light-emitting unit, a second light-emitting unit and a third light-emitting unit. The first light-emitting unit is adapted for emitting a first color light. The second light-emitting unit is adapted for emitting a second color light. The third light-emitting unit is adapted for emitting a third color light.

In an embodiment of the disclosure, when the MEM display module is in a display mode, the light-emitting apparatus emits the first color light, the second color light and the third color light sequentially.

In an embodiment of the disclosure, the first color light is a red light; the second color light is a green light; the third color light is a blue light.

In an embodiment of the disclosure, the step of controlling the time for which the second light-shielding units expose the reflective pattern layer is making the second light-shielding units always cover the reflective pattern layer when displaying the image frame.

In an embodiment of the disclosure, the second light-shielding units always cover the reflective pattern layer completely, so that the amount of the external beam reflected by the reflective pattern layer is substantially zero.

In an embodiment of the disclosure, the first light-shielding units and the second light-shielding units have a matrix arrangement.

In an embodiment of the disclosure, the light-emitting apparatus includes a first light-emitting unit, a second light-emitting unit and a third light-emitting unit. The first light-emitting unit, the second light-emitting unit and the third light-emitting unit emit a first color light, a second color light and a third color light sequentially to compose the illumination beam.

In an embodiment of the disclosure, the first color light is a red light; the second color light is a green light; the third color light is a blue light.

In an embodiment of the disclosure, the step of controlling the time for which the second light-shielding units expose the reflective pattern layer is controlling the time for which the second light-shielding units expose the reflective pattern layer, so that the amount of the external beam reflected by the reflective pattern layer is greater than zero.

In an embodiment of the disclosure, when the time for which the second light-shielding units expose the reflective pattern layer is controlled so that the amount of the external beam reflected by the reflective pattern layer is greater than zero, the image frame is a black frame.

In an embodiment of the disclosure, when the time for which the second light-shielding units expose the reflective pattern layer is controlled so that the amount of the external beam reflected by the reflective pattern layer is greater than zero, the first light-shielding units are made to always shield the illumination beam completely to display the black frame.

In an embodiment of the disclosure, when the time for which the second light-shielding units expose the reflective pattern layer is controlled so that the amount of the external beam reflected by the reflective pattern layer is greater than zero, the light-emitting apparatus is turned off so that the light-emitting apparatus does not emit the illumination beam.

Based on the above, with the first light-shielding units working in conjunction with the light-shielding pattern layer and with the second light-shielding units working in conjunction with the reflective pattern layer, the MEM display module of an embodiment of the disclosure has both a display function and a mirror function. Therefore, the MEM display module of an embodiment of the disclosure has a high added value.

In order to make the aforementioned features and advantages of the disclosure more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the disclosure.

DESCRIPTION OF EMBODIMENTS

Figure 1A:
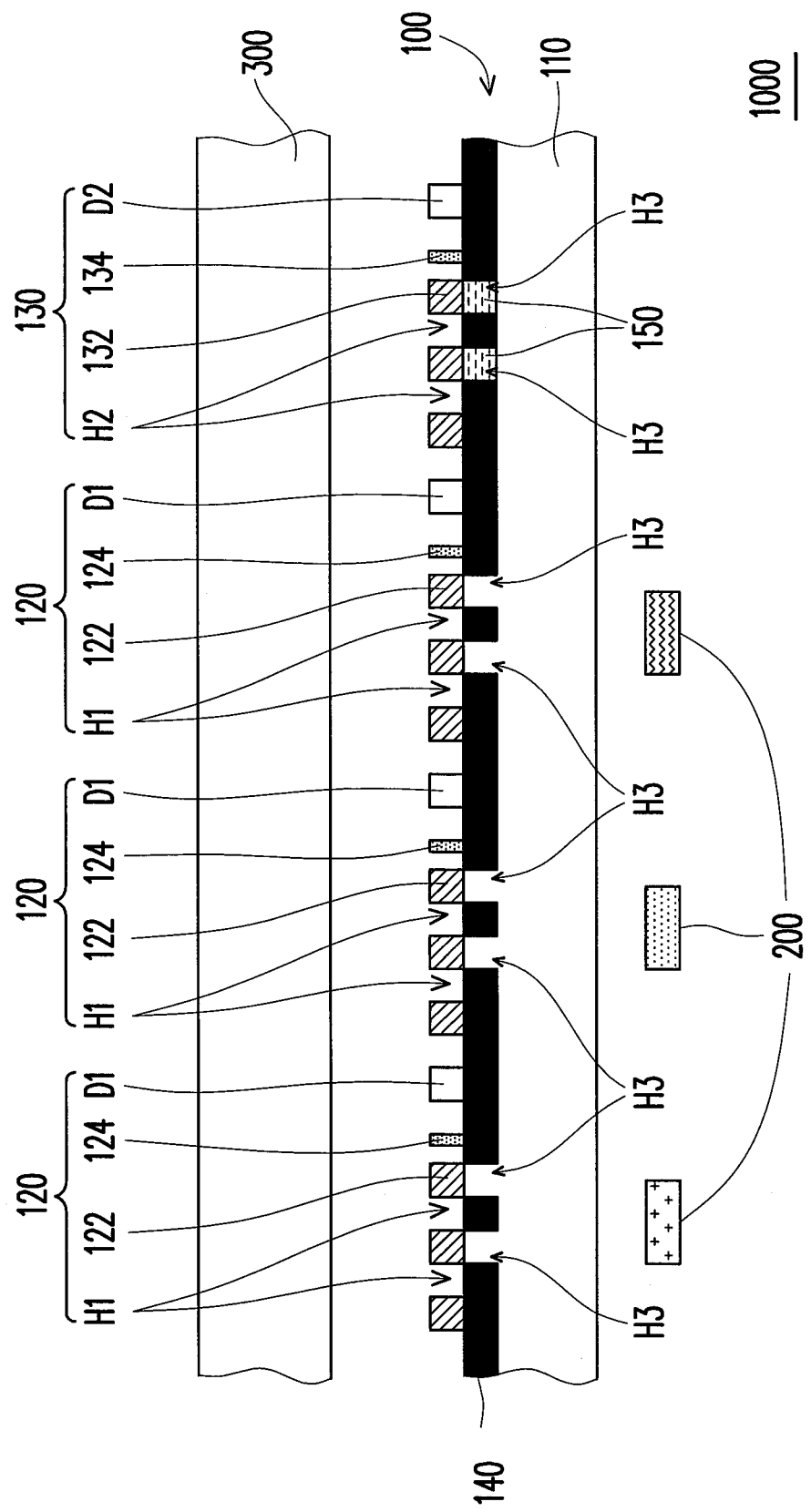
FIG. 1A illustrates a schematic cross-sectional view of a MEM display module according to an embodiment of the disclosure.
Figure 1B:
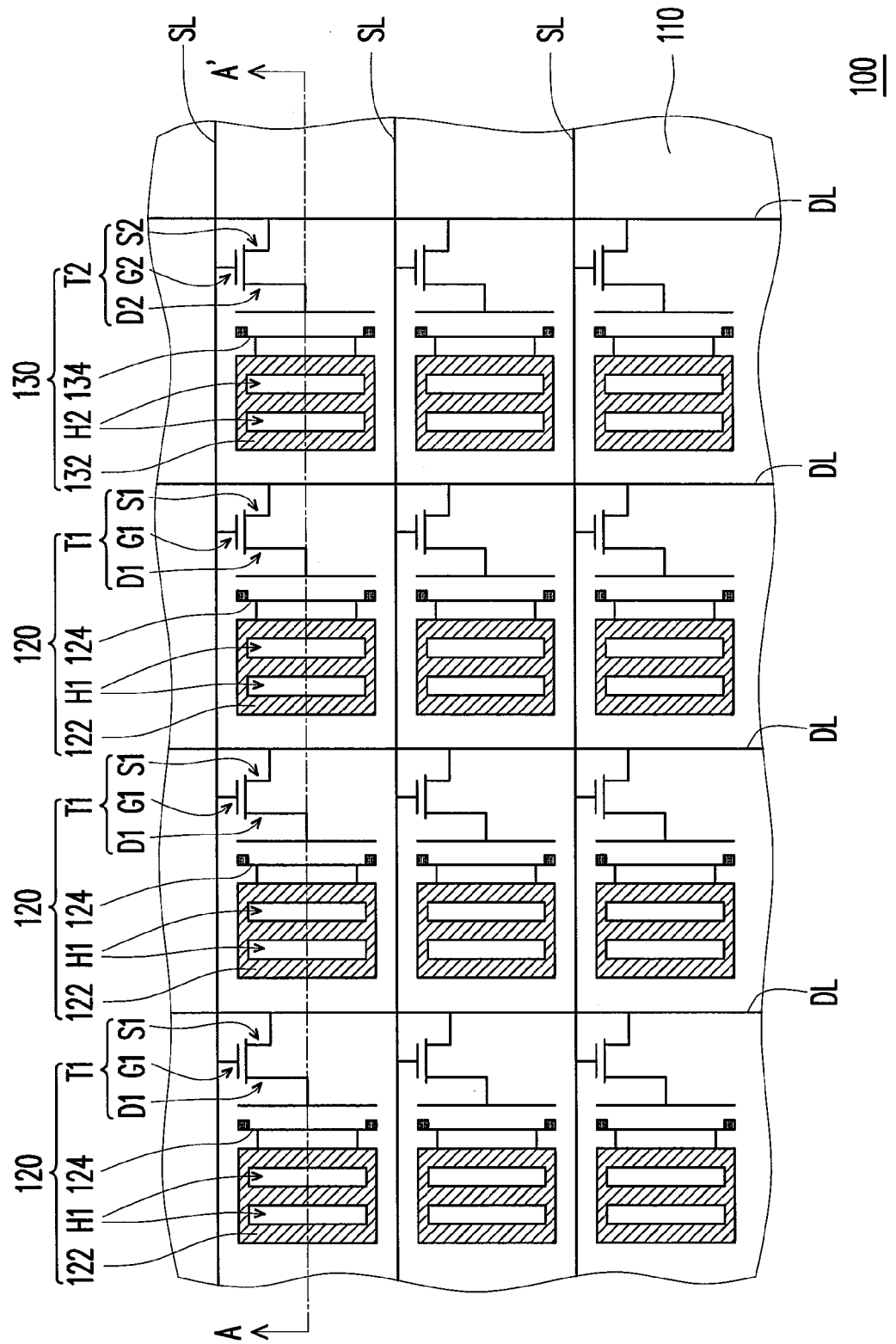
FIG. 1B is a schematic top view of a MEM display panel of FIG. 1A.

FIG. 1A illustrates a schematic cross-sectional view of a MEM display module according to an embodiment of the disclosure. FIG. 1B is a schematic top view of a MEM display panel of FIG. 1A. Particularly, FIG. 1A corresponds to a section line A-A' in FIG. 1B. For the sake of clarity of expression, FIG. 1B omits illustrating a light-shielding pattern layer and a reflective pattern layer of FIG. 1A. Referring to FIGS. 1A and 1B, a MEM display module 1000 of the present embodiment includes a MEM display panel 100 and a light-emitting apparatus 200. The MEM display module 1000 of the present embodiment includes a protective cover 300 on the MEM display panel 100. The protective cover 300 protects the MEM display panel 100. In the present embodiment, the light-emitting apparatus 200 is composed of a plurality of light-emitting diodes (LEDs), for example, but the disclosure is not limited thereto. In other embodiments, the light-emitting apparatus 200 may be composed of other light-emitting devices (such as cold-cathode tubes).

The MEM display panel 100 of the present embodiment includes a substrate 110, a plurality of first light-shielding units 120 and a plurality of second light-shielding units 130 arranged in arrays on the substrate 110, a light-shielding pattern layer 140 disposed on the substrate 110, and a reflective pattern layer 150 disposed on the substrate 110. The light-shielding pattern layer 140 has a plurality of third openings H3. In the present embodiment, the reflective pattern layer 150 is filled into at least one of the third openings H3. More specifically, the reflective pattern layer 150 may be filled into the third openings H3 corresponding to the second light-shielding units 130. As shown in FIG. 1B, the MEM display panel 100 of the present embodiment may further include a plurality of data lines DL and a plurality of scan lines SL interlaced with the data lines DL.

As shown in FIGS. 1A and 1B, each of the first light-shielding units 120 includes a first movable light-shielding device 122 having at least one first opening H1. As shown in FIG. 1B, in the present embodiment, each of the first light-shielding units 120 further includes a first active device T1 that makes the first movable light-shielding device 122 move. The first active device T1 has a first source S1 that is electrically connected with the data lines DL, a first gate G1 that is electrically connected with the scan lines SL, and a first drain D1. In the present embodiment, the first active device T1 is, for example, a thin film transistor (TFT). Each of the first light-shielding units 120 further includes a first actuator 124 connected with the first movable light-shielding device 122. The first actuator 124 is adapted for being attracted by the first drain D1 of the first active device T1 to lead the first movable light-shielding device 122 to move relative to the light-shielding pattern layer 140.

Similarly, as shown in FIG. 1B, each of the second light-shielding units 130 includes a second movable light-shielding device 132 having at least one second opening H2. In the present embodiment, each of the second light-shielding units 130 further includes a second active device T2 that makes the second movable light-shielding device 132 move. The second active device T2 has a second source S2 that is electrically connected with the data lines DL, a second gate G2 that is electrically connected with the scan lines SL, and a second drain D2. In the present embodiment, the second active device T2 may also be a thin film transistor. Each of the second light-shielding units 130 further includes a second actuator 134 connected with the second movable light-shielding device 132. The second actuator 134 is adapted for being attracted by the second drain D2 of the second active device T2 to lead the second movable light-shielding device 132 to move relative to the reflective pattern layer 150.

Referring to FIG. 1A again, with the first openings H1 of the first movable light-shielding devices 122 working in conjunction with the third openings H3 of the light-shielding pattern layer 140, the MEM display module 1000 of the present embodiment displays various frames. Examples are described below with reference to FIGS. 2A and 2B.

Figure 2A:
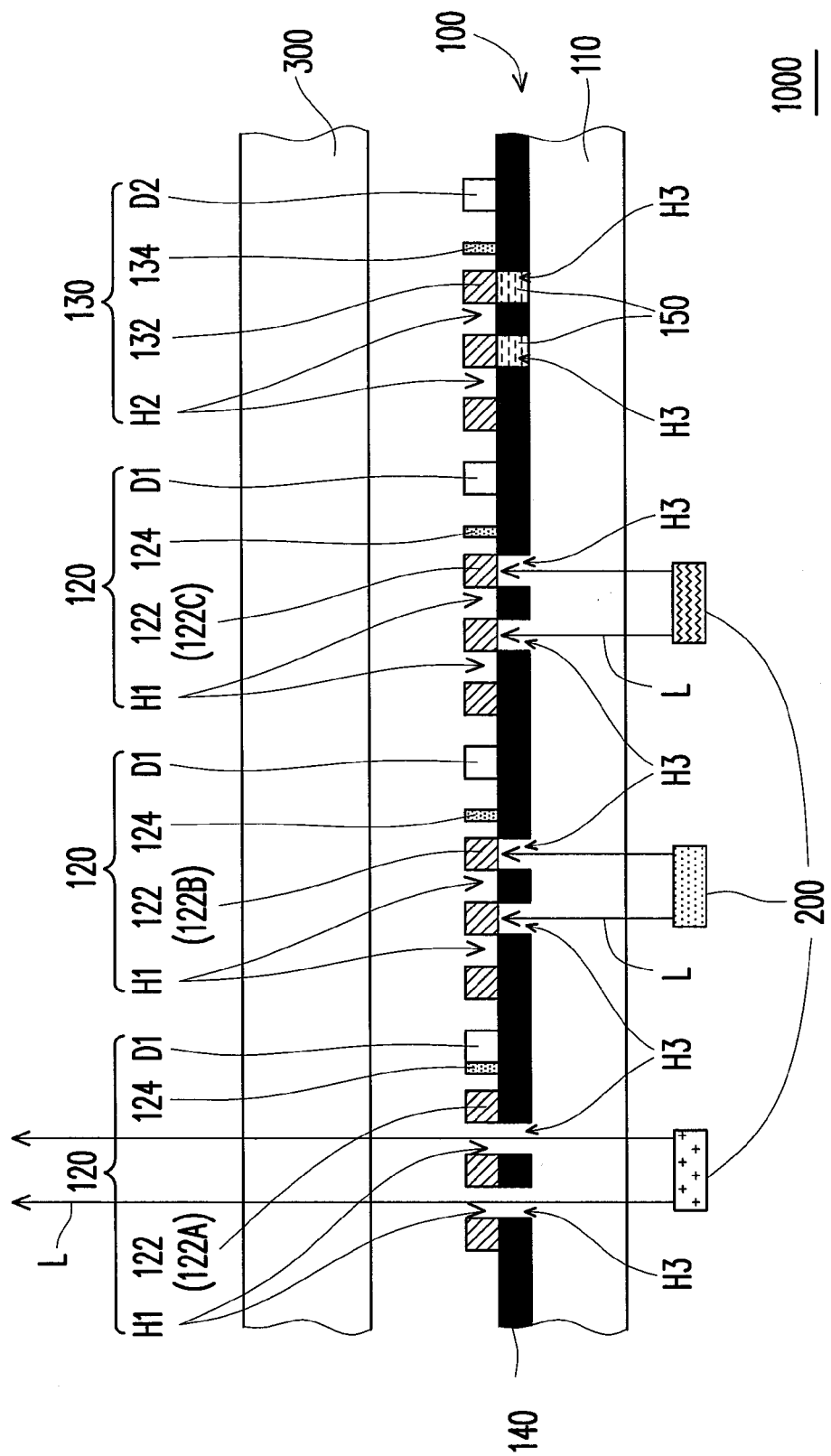
FIG. 2A illustrates a state where the MEM display module of FIG. 1 is in a display mode.
Figure 2B:
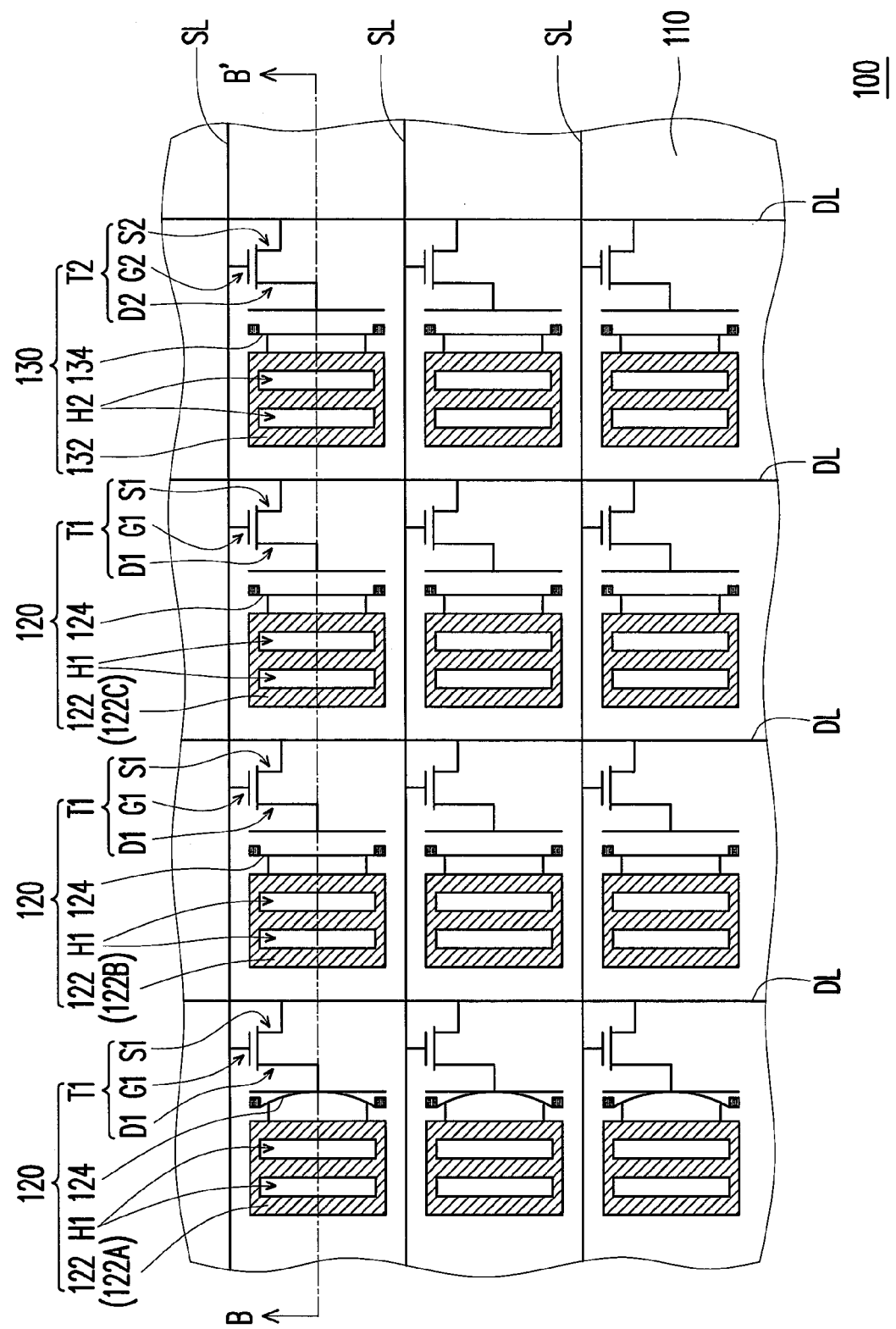
FIG. 2B illustrates a MEM display panel of FIG. 2A.

FIG. 2A illustrates a state where the MEM display module of FIG. 1 is in a display mode, and FIG. 2B illustrates the MEM display panel of FIG. 2A. Particularly, FIG. 2A corresponds to a section line B-B' in FIG. 2B. As shown in FIG. 2A, when the MEM display module 1000 of the present embodiment is in a display mode, the first opening H1 of at least one first movable light-shielding device 122A overlaps the third openings H3. The first movable light-shielding devices 122B and 122C cover the third openings H3 corresponding thereto. In detail, as shown in FIGS. 2A and 2B, when the MEM display module 1000 of the present embodiment is in the display mode, the first gate G1 of the first active device T1 is turned on by a scan signal transmitted by the scan lines SL, and at this time a drive signal transmitted by the data lines DL passes through the first gate G1 and is transmitted to the first drain D1. When there is an electric potential difference between the drive signal transmitted to the first drain D1 and the first movable light-shielding device 122A, the first drain D1 attracts the first actuator 124 and leads the first movable light-shielding device 122A to move right, thereby making the first opening H1 of the first movable light-shielding device 122A overlap the third openings H3. When there is no electric potential difference between the drive signal transmitted to the first drain D1 and the first movable light-shielding devices 122B and 122C, the first drain D1 does not attract the first actuator 124, making the first movable light-shielding devices 122B and 122C cover the third openings H3 corresponding thereto.

At this time, as shown in FIG. 2A, a portion of a beam L emitted by the light-emitting apparatus 200 passes through the first opening H1 of the first movable light-shielding device 122A and the third openings H3, and a portion of the beam L is blocked by the first movable light-shielding devices 122B and 122C after passing through the third openings H3. Through the above mechanism, the MEM display module 1000 of the present embodiment displays various frames. In addition, a gray scale the frames intend to present is realized by controlling a time for which the first openings H1 of the first movable light-shielding devices 122 overlap the third openings H3.

It should be noted that, as shown in FIG. 2A, when the MEM display module 1000 of the present embodiment is in the display mode, each of the second movable light-shielding devices 132 covers the reflective pattern layer 150. The second opening H2 of each of the second movable light-shielding devices 132 is covered by the reflective pattern layer 150. In detail, as shown in FIGS. 2A and 2B, when the MEM display module 1000 of the present embodiment is in the display mode, the second gate G2 of the second active device T2 is turned on by the scan signal transmitted by the scan lines SL, and the drive signal transmitted by the data lines DL passes through the second gate G2 and is transmitted to the second drain D2. When there is no electric potential difference between the drive signal transmitted to the second drain D2 and the second movable light-shielding device 132, the second drain D2 does not attract the second actuator 134, making the second movable light-shielding device 132 cover the reflective pattern layer 150. In this way, an external beam is unlikely to be reflected by the reflective pattern layer 150 to influence a display effect of the MEM display module 1000.

In addition, with the second opening H2 of the second movable light-shielding device 132 working in conjunction with the reflective pattern layer 150, the MEM display module 1000 of the present embodiment may be in a reflective mode and exhibits a mirror effect. Examples are described below with reference to FIGS. 3A and 3B.

Figure 3A:
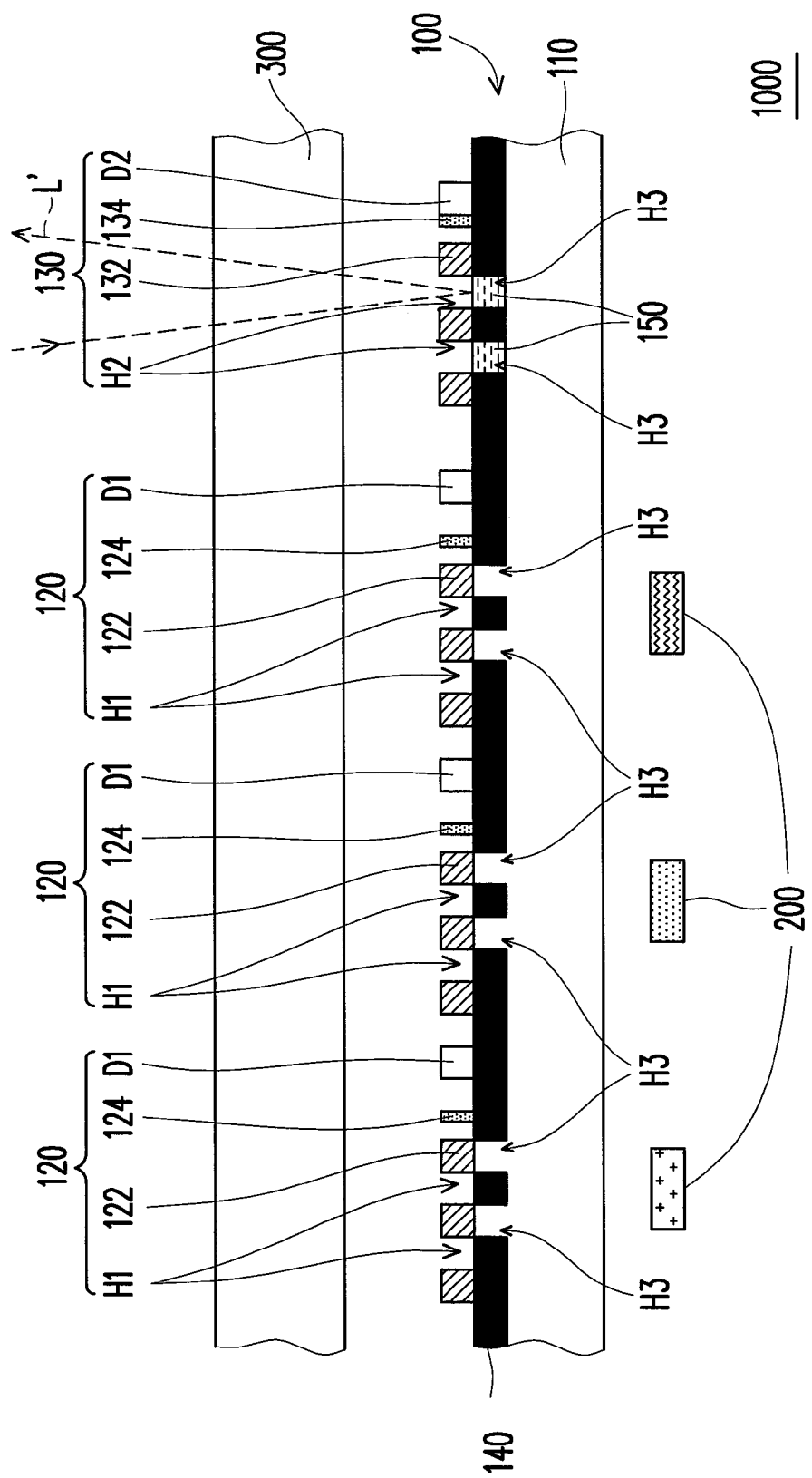
FIG. 3A illustrates a state where the MEM display module of FIG. 1 is in a reflective mode.
Figure 3B:
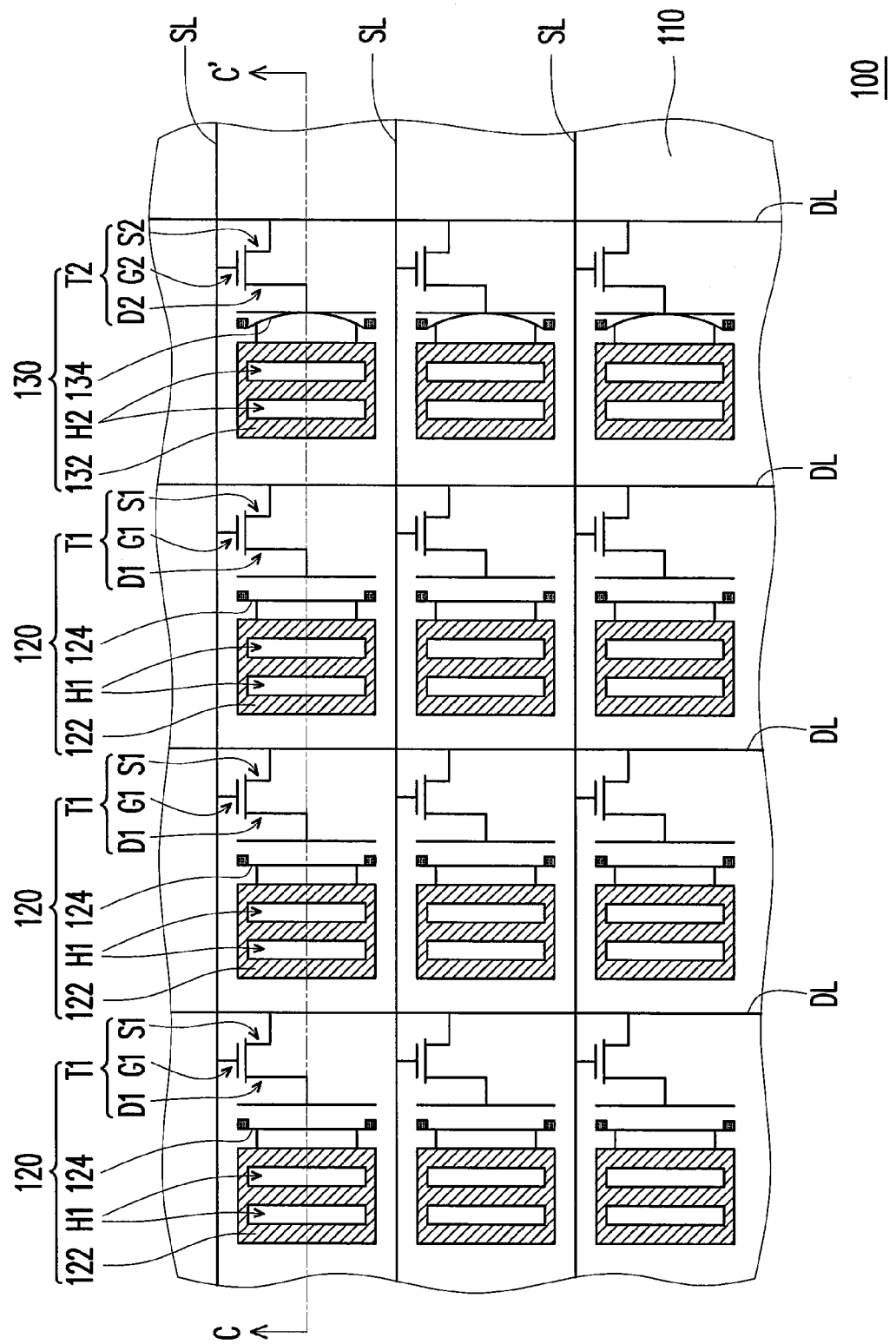
FIG. 3B illustrates a MEM display panel of FIG. 3A.

FIG. 3A illustrates a state where the MEM display module of FIG. 1 is in the reflective mode, and FIG. 3B illustrates the MEM display panel of FIG. 3A. Particularly, FIG. 3A corresponds to a section line C-C' in FIG. 3B. As shown in FIG. 3A, when the MEM display module 1000 of the present embodiment is in the reflective mode, the first opening H1 of each of the first movable light-shielding devices 122 is covered by the light-shielding pattern layer 140, and the second opening H2 of each of the second movable light-shielding devices 132 exposes the reflective pattern layer 150. Referring to FIGS. 3A and 3B, in detail, as shown in FIGS. 3A and 3B, when the MEM display module 1000 of the present embodiment is in the reflective mode, the first gate G1 (and the second gate G2) of the first active device T1 (and the second active device T2) are turned on by the scan signal transmitted by the scan lines SL, and the drive signal transmitted by the data lines DL passes through the first gate G1 (and the second gate G2) and is transmitted to the first drain D1 (and the second drain D2). When there is no electric potential difference between the drive signal transmitted to the first drain D1 and the first movable light-shielding devices 122, the first drain D1 does not attract the first actuator 124, making the first openings H1 of the first movable light-shielding devices 122 be covered by the light-shielding pattern layer 140. When there is an electric potential difference between the drive signal transmitted to the second drain D2 and the second movable light-shielding devices 132, the second drain D2 attracts the second actuator 134 and leads the second movable light-shielding devices 132 to move right, thereby making the second openings H2 of the second movable light-shielding devices 132 expose the reflective pattern layer 150. At this time, an external beam L' is reflected by the reflective pattern layer 150 after passing through the second openings H2, so that the MEM display module 1000 of the present embodiment may exhibit a mirror effect.

It should be mentioned that, in the disclosure, locations of the first light-shielding units to provide a display function and locations of the second light-shielding units and the reflective pattern layer to provide a reflective function are not limited to the locations illustrated in FIGS. 1A to 3B. The locations of the first light-shielding units and the locations of the second light-shielding units and the reflective pattern layer may be designed properly according to actual needs.

The MEM display module 1000 of the present embodiment may display a colored frame in addition to a gray scale frame. Examples are described below with reference to FIGS. 4 to 6.

Figure 4:
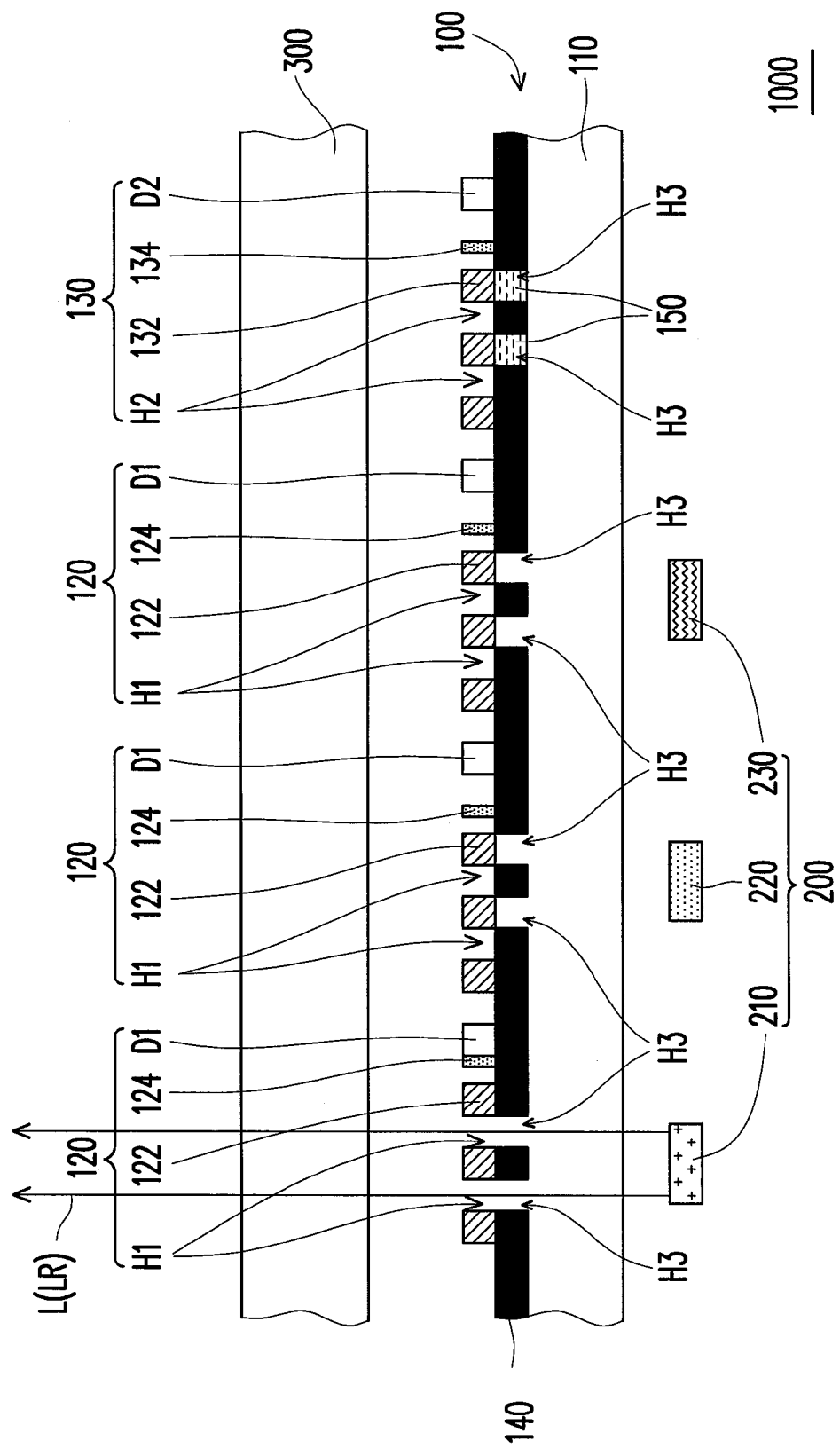
FIG. 4 illustrates a situation where the MEM display module of FIG. 1 displays a first sub-frame.
Figure 5:
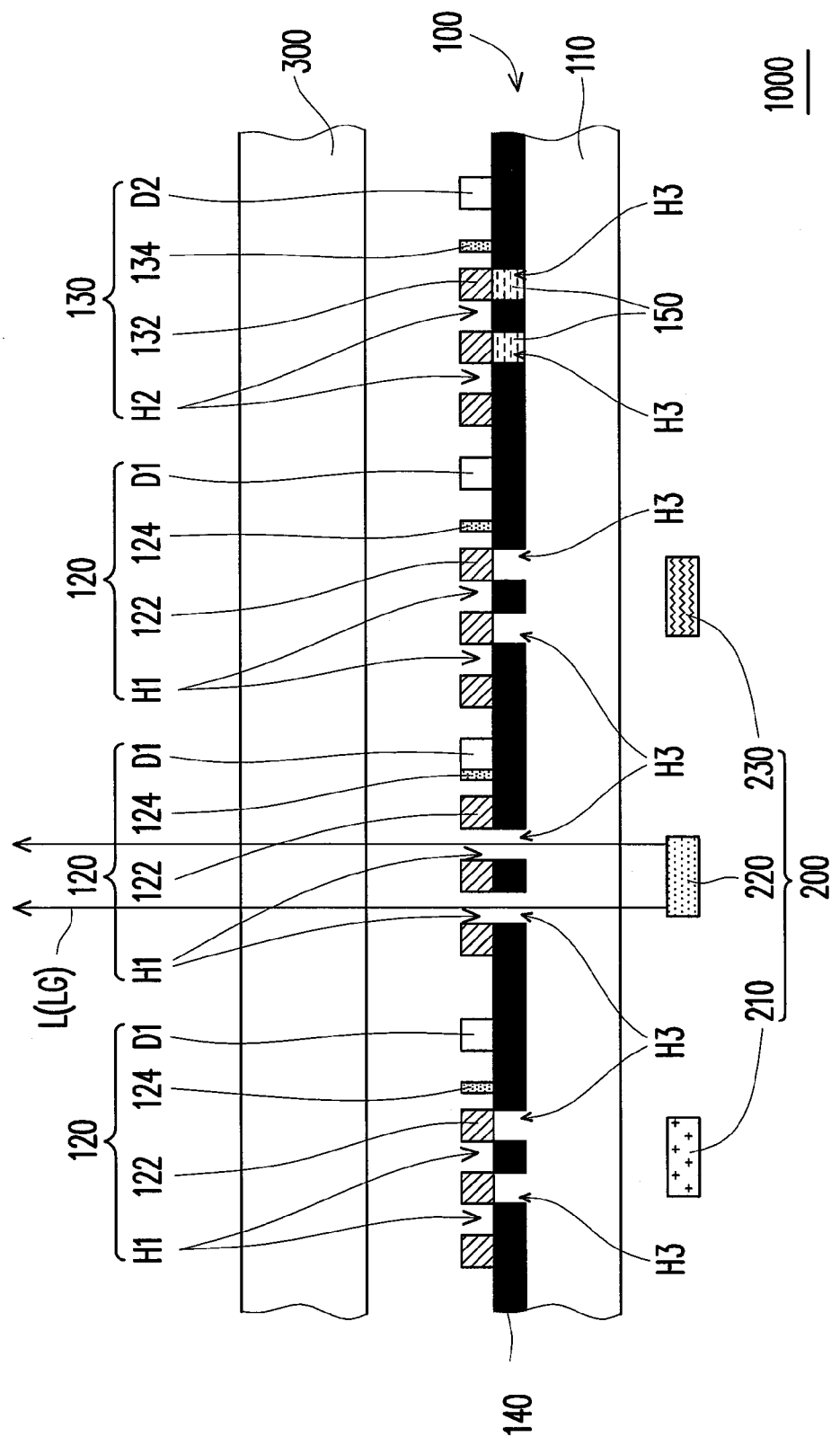
FIG. 5 illustrates a situation where the MEM display module of FIG. 1 displays a second sub-frame.
Figure 6:
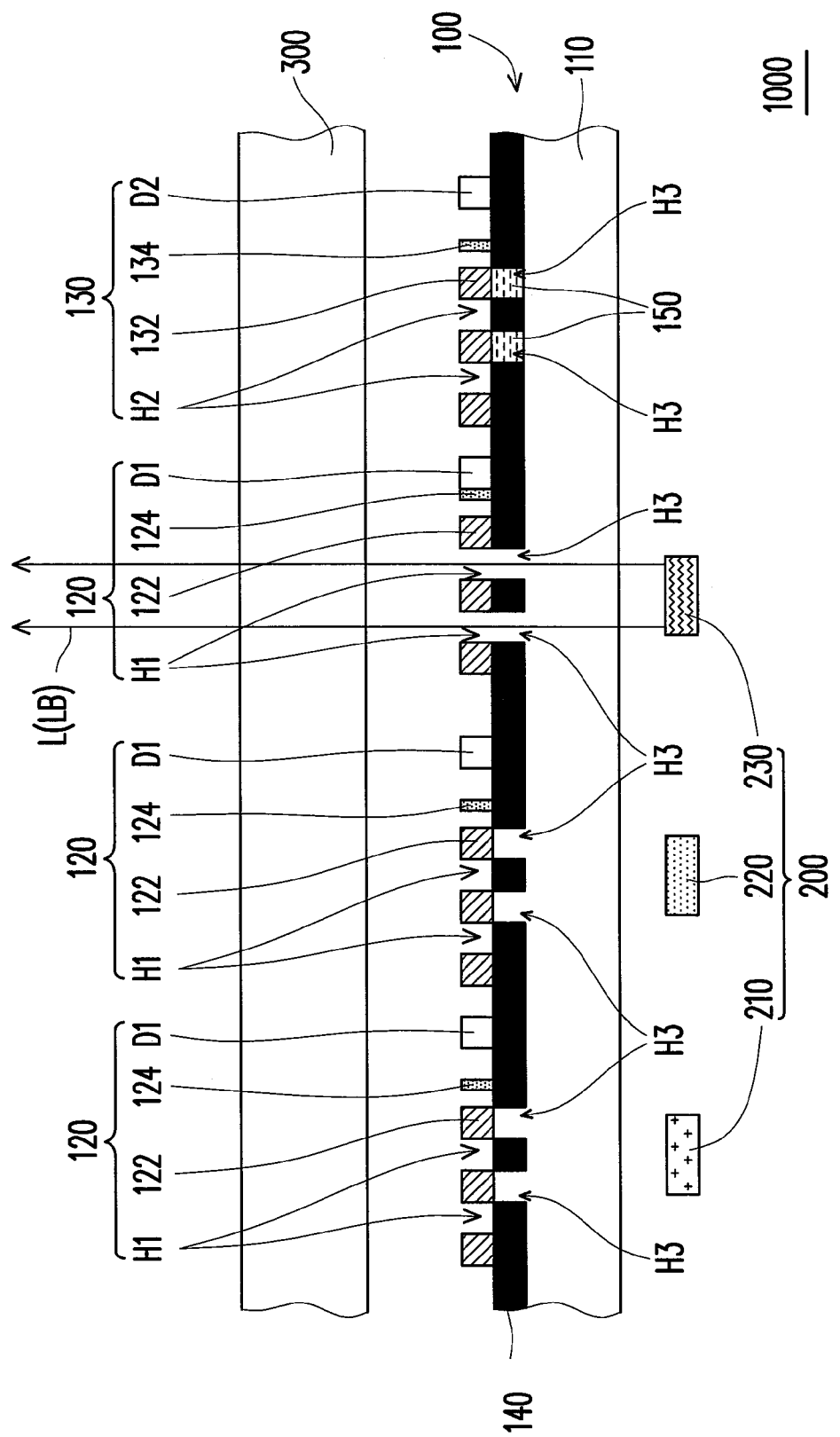
FIG. 6 illustrates a situation where the MEM display module of FIG. 1 displays a third sub-frame.

FIG. 4 illustrates a situation where the MEM display module of FIG. 1 displays a first sub-frame. FIG. 5 illustrates a situation where the MEM display module of FIG. 1 displays a second sub-frame. FIG. 6 illustrates a situation where the MEM display module of FIG. 1 displays a third sub-frame. Referring to FIGS. 4, 5 and 6, the light-emitting apparatus 200 of the present embodiment includes a first light-emitting unit 210, a second light-emitting unit 220 and a third light-emitting unit 230. The first light-emitting unit 210 is adapted for emitting a first color light LR. The second light-emitting unit 220 is adapted for emitting a second color light LG. The third light-emitting unit 230 is adapted for emitting a third color light LB. The first color light LR is, for example, a red light. The second color light LG is, for example, a green light. The third color light LB is, for example, a blue light. When the MEM display module 1000 of the present embodiment intends to display a colored frame, as shown in FIG. 4, the light-emitting apparatus 200 emits the first color light LR first, and at the same time the first light-shielding units 120 of the MEM display panel 100 exhibit the first sub-frame (such as a red frame) corresponding to the first color light LR. Then, as shown in FIG. 5, the light-emitting apparatus 200 emits the second color light LG, and at the same time the first light-shielding units 120 of the MEM display panel 100 exhibit the second sub-frame (such as a green frame) corresponding to the second color light LG. Then, as shown in FIG. 6, the light-emitting apparatus 200 emits the third color light LB, and at the same time the first light-shielding units 120 of the MEM display panel 100 exhibit the third sub-frame (such as a blue frame) corresponding to the third color light LB. In addition, during the time when the first sub-frame, the second sub-frame and the third sub-frame are exhibited, each of the second movable light-shielding devices 132 covers the reflective pattern layer 150. The first sub-frame (such as a red frame) corresponding to the first color light LR, the second sub-frame (such as a green frame) corresponding to the second color light LG and the third sub-frame (such as a blue frame) corresponding to the third color light LB compose a complete colored frame. In the present embodiment, a sum of the time for which the first sub-frame, the second sub-frame and the third sub-frame are displayed may be less than the visual persistence time of human eyes, so that users may watch the colored frame composed of the first sub-frame, the second sub-frame and the third sub-frame.

Based on the above, with the first light-shielding units working in conjunction with the light-shielding pattern layer and with the second light-shielding units working in conjunction with the reflective pattern layer, the MEM display module of an embodiment of the disclosure has both a display function and a mirror function. Therefore, the MEM display module of an embodiment of the disclosure has a high added value.

Although the disclosure has been described with reference to the above embodiments, they are not intended to limit the disclosure. It is apparent to people of ordinary skill in the art that modifications and variations to the disclosure may be made without departing from the spirit and scope of the disclosure. In view of the foregoing, the protection scope of the disclosure will be defined by the attached claims.

What is claimed is:

1. A micro-electro-mechanical (MEM) display module, comprising:
    a MEM display panel, comprising:
        a substrate;
        a plurality first light-shielding units, each of the first light-shielding units comprising a first movable light-shielding device having at least one first opening;
        a plurality second light-shielding units, the first light-shielding units and the second light-shielding units being arranged in arrays on the substrate, each of the second light-shielding units comprising a second movable light-shielding device having at least one second opening;
        a light-shielding pattern layer disposed on the substrate and having a plurality of third openings; and
        a reflective pattern layer disposed on the substrate, wherein the reflective pattern is not light-transmissive; and
    a light-emitting apparatus disposed beside the MEM display panel, wherein when the MEM display module is in a display mode, the at least one first opening of the first movable light-shielding devices overlaps at least one of the third openings, and each of the second movable light-shielding devices covers the reflective pattern layer, and when the MEM display module is in a reflective mode, the first opening of each of the first movable light-shielding devices is covered by the light-shielding pattern layer, and the second opening of each of the second movable light-shielding devices exposes the reflective pattern layer.

2. The MEM display module according to claim 1, wherein when the MEM display module is in the display mode, the second opening of each of the second movable light-shielding devices is covered by the reflective pattern layer.

3. The MEM display module according to claim 1, wherein the reflective pattern layer is filled into at least one of the third openings.

4. The MEM display module according to claim 1, wherein each of the first light-shielding units further comprises a first active device that makes the first movable light-shielding device move, and each of the second light-shielding units further comprises a second active device that makes the second movable light-shielding device move.

5. The MEM display module according to claim 4, wherein each of the first light-shielding units further comprises a first actuator connected with the first movable light-shielding device, the first actuator is adapted for being attracted by a first drain of the first active device to lead the first movable light-shielding device to move relative to the light-shielding pattern layer, each of the second light-shielding units further comprises a second actuator connected with the second movable light-shielding device, and the second actuator is adapted for being attracted by a second drain of the second active device to lead the second movable light-shielding device to move relative to the reflective pattern layer.

6. The MEM display module according to claim 4, wherein the MEM display panel further comprises a plurality of data lines and a plurality of scan lines interlaced with the data lines, a plurality of first sources of the first active devices and a plurality of second sources of the second active devices are electrically connected with the data lines, and a plurality of first gates of the first active devices and a plurality of second gates of the second active devices are electrically connected with the scan lines.

7. The MEM display module according to claim 1, wherein the light-emitting apparatus comprises a first light-emitting unit, a second light-emitting unit and a third light-emitting unit, the first light-emitting unit is adapted for emitting a first color light, the second light-emitting unit is adapted for emitting a second color light, and the third light-emitting unit is adapted for emitting a third color light.

8. The MEM display module according to claim 7, wherein when the MEM display module is in the display mode, the light-emitting apparatus emits the first color light, the second color light and the third color light sequentially.

9. The MEM display module according to claim 7, wherein the first color light is a red light, the second color light is a green light, and the third color light is a blue light.

10. A display method, comprising:
    providing a light-emitting apparatus to emit an illumination beam;
    providing a plurality of first light-shielding units disposed on a transmission path of the illumination beam;
    controlling a time for which the first light-shielding units shield the illumination beam respectively to display an image frame;
    providing a reflective pattern layer;
    providing a plurality of second light-shielding units; and
    controlling a time for which the second light-shielding units expose the reflective pattern layer to determine an amount of an external beam reflected by the reflective pattern layer, wherein the plurality of first light-shielding units and the plurality of second light-shielding units are separated from each other and are respectively electrically independent during the controlling operations.

11. The display method according to claim 10, wherein the step of controlling the time for which the second light-shielding units expose the reflective pattern layer is:
making the second light-shielding units always cover the reflective pattern layer when displaying the image frame.

12. The display method according to claim 11, wherein the second light-shielding units always cover the reflective pattern layer completely, so that the amount of the external beam reflected by the reflective pattern layer is substantially zero.

13. The display method according to claim 10, wherein the first light-shielding units and the second light-shielding units have a matrix arrangement.

14. The display method according to claim 10, wherein the light-emitting apparatus comprises a first light-emitting unit, a second light-emitting unit and a third light-emitting unit, and the first light-emitting unit, the second light-emitting unit and the third light-emitting unit emit a first color light, a second color light and a third color light sequentially to compose the illumination beam.

15. The display method according to claim 14, wherein the first color light is a red light, the second color light is a green light, and the third color light is a blue light.

16. The display method according to claim 10, wherein the step of controlling the time for which the second light-shielding units expose the reflective pattern layer is: controlling the time for which the second light-shielding units expose the reflective pattern layer, so that the amount of the external beam reflected by the reflective pattern layer is greater than zero.

17. The display method according to claim 16, wherein when the time for which the second light-shielding units expose the reflective pattern layer is controlled so that the amount of the external beam reflected by the reflective pattern layer is greater than zero, the image frame is a black frame.

18. The display method according to claim 17, wherein when the time for which the second light-shielding units expose the reflective pattern layer is controlled so that the amount of the external beam reflected by the reflective pattern layer is greater than zero, the first light-shielding units are made to always shield the illumination beam completely to display the black frame.

19. The display method according to claim 16, wherein when the time for which the second light-shielding units expose the reflective pattern layer is controlled so that the amount of the external beam reflected by the reflective pattern layer is greater than zero, the light-emitting apparatus is turned off so that the light-emitting apparatus does not emit the illumination beam.

* * * * *